phure, mixture rapidly becomes strongly colored or has reached nearly its final color or the content of vat dyestuff in the ester liquor determined by test has sunk to a small amount, generally to less than 1 percent.

United States Patent Office 2,803,630
Patented Aug. 20, 1957

2,803,630

PROCESS FOR THE MANUFACTURE OF SALTS OF SULPHURIC ACID ESTERS OF LEUCO VAT DYESTUFFS OF THE ANTHRAQUINONE SERIES

Walter Oppliger, Basel, Switzerland, assignor to Durand & Huguenin A. G., Basel, Switzerland, a Swiss firm No Drawing. Application February 7, 1955,
Serial No. 486,736

7 Claims. (Cl. 260—276)

In specification Ser. No. 212,834 now abandoned is described a process for converting vat dyestuffs of the anthraquinone series, which are difficult to esterify, into their water-soluble leuco sulphuric ester salts, wherein the vat dyestuff is treated in a mixture of α-picoline and diethyl-cyclohexylamine containing 10–60 percent by weight of diethylcyclohexylamine, and in the presence of finely divided copper or brass, with chlorosulphonic acid in the form of its addition products with the said bases.

In the process of specification Ser. No. 319,174 now abandoned of 1952, the invention of which is an improvement in or modification of the invention of specification Ser. No. 357,894, there is used, instead of or in addition to finely divided copper or brass, at least one finely divided metal of the iron group (group VIII, period 3, of the periodic system), namely iron, cobalt and nickel.

Specification Ser. No. 357,894 of 1952 describes a further improvement in or modification of the processes of the aforesaid specifications, in which there is used, instead of diethyl-cyclohexylamine, at least one of the three isomeric diethyl-(monomethyl-cyclohexyl)-amines with or without the addition of diethyl-cyclohexylamine, the proportion of the said amine or amines amounting to 10–60 percent by weight of the mixture thereof with α-picoline.

In specification Ser. No. 357,335 of 1953 is described a process for the manufacture of water-soluble salts of sulphuric acid esters of leuco vat dyestuffs of the anthraquinone series which are difficult to esterify, wherein the vat dyestuff is treated in a mixture of dimethylformamide and/or diethyl-formamide with diethyl-cyclohexylamine and/or at least one diethyl-(monomethyl-cyclohexyl)-amine, the said mixture containing 10–70 percent by weight of the said amine or amines, and in the presence of at least one finely divided metal of the group consisting of iron, cobalt, copper and a copper alloy, with chlorosulphonic acid in the form of its addition products with the said bases.

The present invention provides a process for the manufacture of water-soluble salts of sulphuric acid esters of leuco vat dyestuffs of the anthraquinone series which are difficult to esterify, wherein the vat dyestuff is treated in a mixture of diethyl-cyclohexylamine and/or at least one diethyl-(monomethyl-cyclohexyl)-amine and at least one inert liquid diluent having a dissolving or dispersing action on chlorosulphonic acid addition products of the said amines, the said mixture containing 30–90 percent of the amine or amines, and in the presence of at least one finely divided metal, such as iron, cobalt, zinc, copper and a copper alloy, with chlorosulphonic acid in the form of its addition products with the said amine or amines, and the resulting sulphuric acid ester compound is converted into a water-soluble ester salt.

As vat dyestuffs of the anthraquinone series which are difficult to esterify there are to be understood those of which the sulphuric acid ester salts can be obtained by the usual methods of esterification only in small yields, that is to say, yields which are insufficient for commercial purposes or are trace-like, or in the form of products which cannot be converted or can be converted only partially into the original dyestuff by the usual method of application. For the purposes of the present invention, the anthraquinone vat dyestuffs in question are those which are difficult to esterify as determined by the test given in specification Ser. No. 212,834 now abandoned. Vat dyestuffs of the anthraquinone series which are difficult to esterify are found, for example, in the following classes:

(1) 1-Aroylaminoanthraquinones which contain as a substituent in the 4-, 5- or 8-position an acylamino or alkoxy group or halogen atom, and especially diaroylaminoanthraquinones and their derivatives containing substituents in the benzene nuclei.

(2) Anthraquinone-carbazoles.

(3) Anthrimides.

(4) Anthraquinine-acridones.

The chlorosulphuric acid may be introduced into the reaction mixture as such or partially or completely in the form of an equivalent mixture of sulphur trioxide and hydrogen chloride or in the form of a sulphur trioxide addition product and a hydrochloride of one or more of the amines used.

The inert diluents used are liquid substances which taken no part chemically in the esterification process of the invention. Furthermore they must possess a dissolving or dispersing action on the addition product of chlorosulphonic acid with diethyl-cyclohexylamine or diethyl - (monomethyl - cyclohexyl) - amine respectively. The inert diluent may be used in a pure form or as a commercial product containing not more than 0.1 percent of water.

Especially suitable inert diluents are, for example, acetone, chloroform, 1:2-dichlorethane, tetrachlorethane, n-propyl chloride, n-propyl bromide, n-butyl chloride, secondary-butyl chloride, tertiary-butyl chloride, secondary-butyl bromide, tertiary-amyl chloride, acetonitrile, benzine (boiling at 120–160°) C., benzene, monochlorobenzene, orthodichlorobenzene, nitrobenzene, toluene, xylene, dioxane or the like.

The necessary quantity of inert liquid diluent to be used in the reaction may consist of a mixture of different inert liquid diluents in any desired relative proportions.

The diethyl-cyclohexylamine and/or diethyl-(monomethyl-cyclohexyl)-amine may be used in the form of the pure base or as a technical product containing not more than 0.1 percent of water. As diethyl-(monomethylcyclohexyl)-amines there are to be understood the three methyl homologues of diethyl-cyclohexylamine, that is to say diethyl-(2-methylcyclohexyl)-amine, diethyl-(3-methyl-cyclohexyl)-amine and diethyl-(4-methylcyclohexyl)-amine. There may be used only one of the aforesaid diethyl-(monomethyl-cyclohexyl)-amines or a mixture of two or three of the latter amines or, if desired, a mixture of at least one diethyl-(monomethyl-cyclohexyl)-amine with diethyl-cyclohexylamine.

The use of a mixture of at least one inert diluent and diethyl-cyclohexylamine and/or at least one diethyl-(monomethyl-cyclohexyl)-amine in suitable relative proportions is of critical importance in the present process. Thus, in order to obtain commercially valuable results it is essential that the proportion of diethyl-cyclohexylamine and/or diethyl-(monomethyl-cyclohexyl)-amine in the mixture should be at least 30 percent and at most 90 percent on the weight of the mixture. Advantageously the proportion of diethyl-cyclohexylamine and/or diethyl-(monomethyl-cyclohexyl)-amine in the mixture lies within the range of 40–70 percent. In order to obtain an optimum yield of sulphuric acid ester salt, the proportion of diethyl-cyclohexylamine and/or diethyl-(monomethyl-cyclohexyl)-amine must be chosen within the aforesaid proportions depending on the behaviour and properties of the particular vat dyestuff used.

If the diethyl-cyclohexylamine and/or diethyl-(monomethyl-cyclohexyl)-amine were replaced, for example, by dimethyl-cyclohexylamine, cyclohexylamine or triethylamine there would be obtained at most an unimportant yield of the sulphuric acid ester salt together with useless products. Only by using the diethyl-cyclohexylamine or a methyl homologue thereof in admixture with at least one inert liquid diluent is a favourable yield of sulphuric acid ester salt obtained.

In the present process there may be used as the metal finely divided iron, cobalt, zinc, copper or a copper alloy. By the expression "finely divided" there is to be understood, for example, the powdered form hitherto used, and preferably a fineness such that the metal passes through a 150 to 200 mesh sieve (see Handbook of Chemistry and Physics, 31st edition, page 2669). The proportion of the metal should be at least 1.5, and preferably at least 2, atomic proportions for each anthraquinone nucleus present in the vat dyestuff. However, it will usually be of advantage to use a proportion considerably in excess of the minimum proportion.

The process may be carried out in the presence of not only one of the said metals, but in the presence of a plurality of these metals. It is of special advantage from the practical point of view to use iron, owing to its low cost.

In another form of the process the metal to be used is subjected to an activating treatment prior to the esterification process and in the absence of the vat dyestuff to be esterified; the activating treatment may be carried out in any suitable way, for instance in an analogous way to that disclosed in application Ser. No. 357,335.

The proportion of the amine or amines must be such as to provide at least 1.4 molecular proportions of the amine or amines for every two molecular proportions of chlorosulphonic acid used, except that if less than 4 molecular proportions of the acid is used not less than 2 molecular proportions of the amine or amines should be present for every two molecular proportions of the acid. However, in order to obtain optimum results it is usually necessary to use a proportion of chlorosulphonic acid, and correspondingly of the amine or amines, several times greater than the minimum proportions mentioned above. The most favourable excess to use depends on the properties of the particular vat dyestuff to be esterified, and can easily be determined by preliminary tests.

The sulphuric acid ester compound resulting from the esterification is converted into a water-soluble ester salt by a method in itself known, for example, by treatment with a suitable base or by any other conventional method. Especially suitable water-soluble sulphuric acid ester salts are the lithium, sodium, potassium, ammonium and hydroxy-alkylamine salts.

The process of this invention may, if desired, be carried out with the exclusion of oxygen.

As compared with the processes hereinbefore referred to, the process of this invention is considerably more economical as, on the one hand, it avoids the need to use a costly mixture of bases and, on the other, a large number of inexpensive diluents is available and the choice can be made in accordance with the current position of the market.

The following examples illustrate the invention, the parts being by weight:

Example 1

40 parts of chlorosulphonic acid are introduced dropwise into a mixture of 80 parts of 1:2-dichlorethane and 120 parts of diethyl-cyclohexylamine, while stirring and cooling, and 10 parts of brass powder and 10 parts of 1:5-dibenzoylaminoanthraquinone are added. The mixture is heated for 5 hours at 58–60° C., while stirring.

For the purpose of working up, the reaction mixture is poured into 1000 parts of an aqueous sodium carbonate solution of 8 percent strength, and the 1:2-dichlorethane and diethyl-cyclohexylamine are removed by distillation in vacuo (bath temperature 50° C.). The precipitate formed is filtered off, and stirred with a solution of 100 parts of alcohol and 200 parts of a sodium hydroxide solution of 30 percent strength in 250 parts of water for 30 minutes at 35–40° C. The mixture is filtered to remove metal residues, the filtrate is concentrated under reduced pressure at a bath temperature of 50° C., and the sulphuric acid ester salt of leuco-1:5-dibenzoyl-aminoanthraquinone is obtained from the concentrated solution by salting out with sodium chloride in a yield exceeding 90 percent.

10 parts of copper powder can be used with the same success, instead of 10 parts of brass powder.

By using, instead of 80 parts of 1:2-dichlorethane, 80 parts of n-butyl chloride, 80 parts of secondary-butyl chloride or 80 parts of tertiary-butyl chloride the leuco sulphuric acid ester salt is likewise obtained in good yield.

10 parts of the anthrimide from 1:3-dichloro-2-methylanthraquinone and 1:4-monobenzoyl-diaminoanthraquinone, instead of 10 parts of 1:5-dibenzoylaminoanthraquinone, can be converted in the same manner into the corresponding leuco sulphuric acid ester salt.

Example 2

To a mixture of 120 parts of diethyl-cyclohexylamine and 80 parts of 1:2-dichlorethane there are added, while stirring and cooling, 40 parts of chlorosulphonic acid, 10 parts of 1:4-dibenzoylamino anthraquinone and 10 parts of iron powder, which latter has been activated for 30 minutes in a mixture of, for example, 20 parts of α-picoline and 30 parts of α-picoline hydrochloride at 20° C., while stirring. The mixture is heated for 5 hours at 55–60° C., while stirring, and is worked up as described in Example 1. The sulphuric acid ester salt of leuco-1:4-dibenzoylaminoanthraquinone is obtained in a yield of 96 percent.

Instead of 10 parts of iron powder there may be used with equal success, 10 parts of a cobalt powder activated in the same manner.

By using, instead of 120 parts of diethyl-cyclohexylamine, 124 parts of diethyl-(2-methylcyclohexyl)-amine the leuco sulphuric acid ester salt is likewise obtained in a yield exceeding 90 percent.

Instead of the diethyl-(2-methyl-cyclohexyl)-amine there may be used with the same success diethyl-(3-methylcyclohexyl)-amine, diethyl-(4-methylcyclohexyl)-amine or a mixture of two or three of these homologues, or a mixture of one or more of them with diethyl-cyclohexylamine.

Example 3

To a mixture of 80 parts of 1:2-dichlorethane and 120 parts of diethyl-cyclohexylamine there are added, while stirring and cooling, 40 parts of chlorosulphonic acid, 10 parts of 1-benzoylamino-4-(4'-dimethyl-sulphonamido)-benzoylaminoanthraquinone and 10 parts of zinc dust. The reaction mixture is stirred at 10° C., for 3 hours. By working up in the manner described in Example 1 there is obtained the sulphuric acid ester salt of leuco 1-benzoylamino-4-(4'-dimethyl-sulphonamido)-benzoyl-aminoanthraquinone in a yield exceeding 80 percent.

Instead of 10 parts of 1-benzoylamino-4-(4'-dimethyl-sulphonamido)-benzoylaminoanthraquinone, 10 parts of 1:4-dibenzoylaminoanthraquinone or 10 parts of 1-benzoylamino-4-methoxyanthraquinone can be conveted into the corresponding leuco sulphuric acid ester salt in the same good yield.

Furthermore, the 10 parts of zinc dust may be replaced by 10 parts of iron powder with the same result.

By using 80 parts of chloroform, instead of 80 parts of 1:2-dichloroethane, the leuco sulphuric acid ester salt is likewise obtained in a yield exceeding 80 percent.

Instead of 80 parts of chloroform, there may be used with equal success 80 parts of acetone, 80 parts of dioxane or a mixture consisting of 20 parts of 1:2-dichlorethane, of 20 parts of chloroform, of 20 parts of acetone and of 20 parts of dioxane.

Example 4

Into a mixture of 120 parts of diethyl-cyclohexylamine and 80 parts of 1:2-dichlorethane there are introduced in succession, while stirring and cooling, 40 parts of chlorosulphonic acid, 10 parts of brass powder and 10 parts of carbazolised di - (5' - benzoylamino-1'-anthraquinonyl)-2-8-diaminochrysene, and then the mixture is heated for 5 hours at 50° C., while stirring.

The product is worked up as described in Example 1. The leuco sulphuric acid ester salt is obtained in a yield exceeding 80 percent.

Instead of 10 parts of carbazolised di-(5'-benzoylamino-1'-anthraquinonyl)-2:8-diaminochrysene, 10 parts of 1-benzoylamino-5-chloranthraquinone can be converted with equal success into the corresponding leuco sulphuric acid ester salt.

By using, instead of 10 parts of brass powder, 10 parts of iron and/or cobalt powder activated as described in Example 2, the same result is obtained.

Instead of 80 parts of 1:2-dichlorethane, there may be used 80 parts of 1:1:2:2-tetrachlorethane, 80 parts of amyl chloride, 100 parts of acetonitrile or 100 parts of ortho-dichlorobenzene, and good yields of the leuco ester salt are likewise obtained.

By using, instead of 80 parts of 1:2-dichlorethane, only 20 parts thereof the leuco sulphuric acid ester salt is obtained under otherwise identical conditions in a yield of only 40 percent.

Example 5

A mixture of 80 parts of acetone, 120 parts of diethyl-cyclohexylamine and 40 parts of chlorosulphonic acid is prepared in the cold, and 15 parts of copper powder and 10 parts of 1:4-dibenzoylaminoanthraquinone are added to the mixture. After stirring the mixture for 2 hours at 50° C., it is worked up as described in Example 1. The leuco sulphuric acid ester salt is obtained in a yield of 80 percent.

Instead of 80 parts of acetone, there may be used with equal success, 80 parts of chloroform, 80 parts of trichlorethane, 80 parts of n-propyl bromide or 80 parts of secondary butyl bromide.

Example 6

To a solution of 120 parts of diethyl-cyclohexylamine in 80 parts of dioxane there are added, while stirring and cooling, 40 parts of chlorsulphonic acid and 10 parts of 1:5-dibenzoylaminoanthraquinone. After the addition of 15 parts of brass powder the mixture is heated for 5 hours at 55–60° C., while stirring, and the reaction mixture is worked up as described in Example 1. The yield of the leuco sulphuric acid ester salt amounts to 92 percent.

A similar result is obtained by using, instead of 15 parts of brass powder, a mixture of 10 parts of copper powder and 5 parts of iron powder.

By using, instead of 80 parts of dioxane, 100 parts of toluene, 100 parts of monochlorobenzene, 100 parts of ortho-dichlorobenzene, 100 parts of xylene or 100 parts of nitrobenzene, a good yield of the sulphuric acid ester salt is likewise obtained.

Example 7

To a mixture of 80 parts of diethyl-cyclohexylamine and 150 parts of 1:2-dichlorethane there are added, while stirring and cooling, 28 parts of chlorosulphonic acid. There are then introduced 10 parts of 2:5:6:7:8-pentachloro-3:4-phthalyl-acridone and 4 parts of brass powder and the whole is heated for 2 hours at 50° C., while stirring. By working up the reaction mixture as described in Example 1, the sulphuric acid ester salt of leuco-2:5:6:7:8-pentachloro-3:4-phthalyl-acridone is obtained in a yield exceeding 80 percent.

Instead of 4 parts of brass powder, there may be used with similar success 4 parts of copper powder or 5 parts of preferably activated cobalt powder.

Instead of 2:5:6:7:8-pentachloro-3:4-phthalyl-acridone, 10 parts of 2:5:7-trichloro-3:4-phthalyl-acridone or 10 parts of 2-para-chlorobenzoylamino-3:4-phthalyl-acridone may be converted under the same conditions into the corresponding leuco sulphuric acid ester salt.

Furthermore, instead of 80 parts of 1:2-dichlorethane, there may be used with equal success 80 parts of dioxane.

What I claim is:

1. A process for the manufacture of water-soluble salts of sulphuric acid esters of leuco vat dyestuffs of the anthraquinone series, which dyestuffs give an ester yield of less than 25% relative to the weight thereof when esterified by means of a mixture of α-picoline and chlorosulphonic acid (10:1 by weight) in the presence of copper powder, comprising reacting the vat dyestuffs in a mixture of at least one amine selected from the group consisting of diethyl-cyclohexylamine and the three isomeric diethyl-(monomethyl-cyclohexyl)-amines and at least one inert liquid diluent having a dissolving to dispersing action on chlorosulphonic acid addition products of said amine or amines, the said mixture containing 30 to 90 percent by weight of said amine or amines, and in the presence of at least one finely divided metal selected from the group consisting of iron, cobalt, zinc, copper and copper alloys, with chlorosulphonic acid in the form of its addition product with at least one of said amines, and converting the resulting sulphuric ester compounds into water-soluble ester salts.

2. A process as claimed in claim 1, wherein the proportion of the said amine or amines in the basic mixture is within the range of 40 to 75 percent on the weight of the said mixture.

3. A process for the manufacture of a water-soluble salt of the sulphuric acid ester of leuco 2-(para-chlorobenzoylamino)-3:4-phthyalyl-acridone, which comprises reacting 2 - (para - chlorobenzoylamino) - 3:4 - phthalyl-acridone with chlorosulphonic acid in a mixture of 1:2-dichlorethane and diethyl-cyclohexylamine containing 40–75% by weight of diethyl-cyclohexylamine and in the presence of finely divided brass.

4. A process for the manufacture of a water-soluble salt of the sulphuric acid ester of leuco 1:5-dibenzoylamino-anthraquinone, which comprises reacting 1:5-dibenzoylaminoanthraquinone with chlorosulphonic acid in a mixture of 1:2-dichlorethane and diethyl-cyclohexylamine and in the presence of finely divided brass.

5. A process for the manufacture of a water-soluble salt of the sulphuric acid ester of leuco 1:4-dibenzoylaminoanthraquinone, which comprises reacting 1:4-dibenzoylaminoanthraquinone with chlorosulphonic acid in a mixture of 1:2-dichlorethane and diethyl-cyclohexylamine containing 40–75% by weight of diethyl-cyclohexylamine and in the presence of finely divided iron.

6. A process for the manufacture of a water-soluble salt of the sulphuric acid ester of leuco 1-benzoylamino-4-(4'-dimethyl-sulphonamido) - benzoylaminoanthraquinone, which comprises reacting 1-benzoylamino-4-(4'-dimethyl - sulphonamido) - benzoylaminoanthraquinone with chlorosulphonic acid in a mixture of 1:2-dichlorethane and diethyl-cyclohexylamine containing 40–75% by weight of diethyl-cyclohexylamine and in the presence of finely divided zinc.

7. A process for the manufacture of a water-soluble salt of the sulphuric acid ester of carbazolized leuco-di-(5' - benzoylamino-1'-anthraquinonyl)-2:8-diaminochrysene, which comprises reacting carbazolized di-(5'-benzoylamino - 1'-anthraquinonyl)-2:8-diaminochrysene with chlorosulphonic acid in a mixture of 1:2-dichlorethane and diethyl - cyclohexylamine containing 40–75% by weight of diethyl-cyclohexylamine and in the presence of finely divided brass.

References Cited in the file of this patent

UNITED STATES PATENTS

| | | |
|---|---|---|
| 2,267,124 | Mieg et al. | Dec. 23, 1941 |
| 2,506,580 | Coffey et al. | May 9, 1950 |
| 2,553,475 | Robson et al. | May 15, 1951 |
| 2,705,717 | Oppliger | Apr. 5, 1955 |